US012597693B2

(12) United States Patent
Reichert et al.

(10) Patent No.: US 12,597,693 B2
(45) Date of Patent: Apr. 7, 2026

(54) ROOF ANTENNA MODULE COMPRISING A SPECIFIC COOLING OF A CONTROL DEVICE ON A VEHICLE ROOF, ARRANGEMENT, MOTOR VEHICLE, AND METHOD

(71) Applicant: VALEO COMFORT AND DRIVING ASSISTANCE, Créteil (FR)

(72) Inventors: Walter Reichert, Creteil (FR); Bálint Levente Csuta, Creteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 86 days.

(21) Appl. No.: 18/683,973

(22) PCT Filed: Jul. 29, 2022

(86) PCT No.: PCT/EP2022/071307
§ 371 (c)(1),
(2) Date: Feb. 15, 2024

(87) PCT Pub. No.: WO2023/020806
PCT Pub. Date: Feb. 23, 2023

(65) Prior Publication Data

US 2025/0141083 A1 May 1, 2025

(30) Foreign Application Priority Data

Aug. 20, 2021 (EP) .................................... 21192436

(51) Int. Cl.
*H01Q 1/02* (2006.01)
*H01Q 1/32* (2006.01)
*H01Q 1/42* (2006.01)

(52) U.S. Cl.
CPC ............. *H01Q 1/02* (2013.01); *H01Q 1/3275* (2013.01); *H01Q 1/42* (2013.01)

(58) Field of Classification Search
CPC .......... H01Q 1/02; H01Q 1/32; H01Q 1/3275; H01Q 1/42
See application file for complete search history.

(56) References Cited

U.S. PATENT DOCUMENTS

2020/0185806 A1 6/2020 Bhalla et al.
2020/0388910 A1 12/2020 Chitaka

FOREIGN PATENT DOCUMENTS

FR 3060214 A1 6/2018
JP 2020-195124 A 12/2020
JP 2021003954 A * 1/2021 ............... H01Q 1/22

OTHER PUBLICATIONS

International Search Report issued in corresponding PCT Application No. PCT/EP2022/071307, dated Oct. 18, 2022. (3 Pages).

(Continued)

*Primary Examiner* — Hoang V Nguyen
(74) *Attorney, Agent, or Firm* — Osha Bergman Watanabe & Burton LLP

(57) ABSTRACT

A roof antenna module to be mounted on a vehicle roof of a motor vehicle is disclosed. The module includes an antenna unit and a control device. The control device includes a housing. The housing bounds a receptacle for electronic components of the control device. The antenna unit is arranged on a top side of the housing which is intentionally provided to face an internal side of the vehicle roof in the assembled state of the roof antenna module with the vehicle roof. At least on the top side, a flow channel of the roof antenna module for a cooling airflow is formed, which is separate from the receptacle.

18 Claims, 5 Drawing Sheets

(56) References Cited

OTHER PUBLICATIONS

Figure 1:
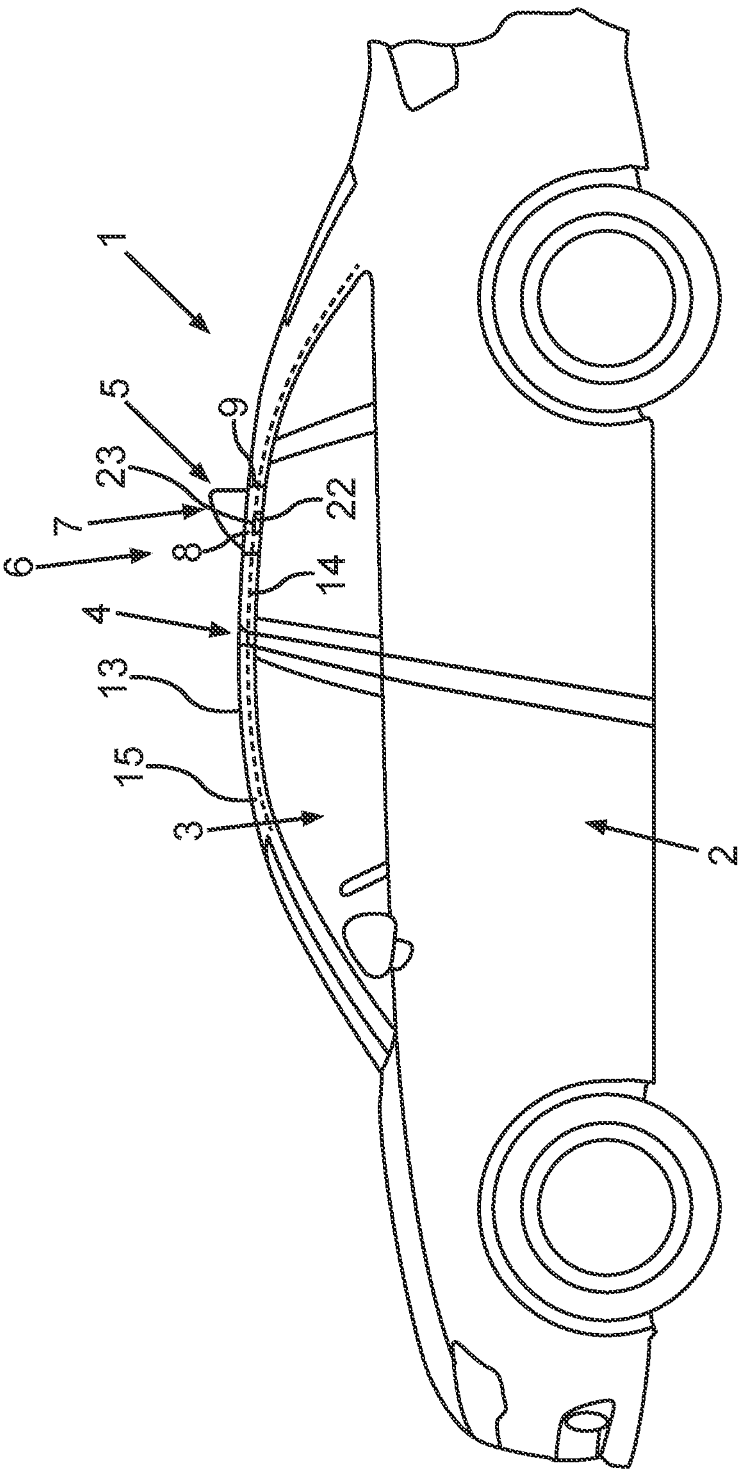

Written Opinion of the International Searching Authority issued in Corresponding PCT Application No. PCT/EP2022/071307, dated Oct. 18, 2022. (7 pages).

* cited by examiner

ROOF ANTENNA MODULE COMPRISING A SPECIFIC COOLING OF A CONTROL DEVICE ON A VEHICLE ROOF, ARRANGEMENT, MOTOR VEHICLE, AND METHOD

An aspect of the invention relates to a roof antenna module to be mounted on a vehicle roof of a motor vehicle. The roof antenna module comprises an antenna unit. A further aspect of the invention relates to an arrangement comprising such a roof antenna module and a vehicle roof. A yet further aspect of the invention relates to a motor vehicle. Moreover, an aspect of the invention relates to a method for cooling an interface region between an outer roof of a vehicle roof and a control device of a roof antenna module.

In the case of motor vehicles it is known that a roof antenna module is fixed to a vehicle roof. An antenna unit in this connection is located external to the vehicle. It is positioned above the vehicle roof. Such antenna units comprise a finlike housing, which is projecting from the vehicle roof upward. From the US 2020/0185806 A1 such a roof antenna module is known.

Since roof antenna modules on the vehicle roof commonly are also exposed to the environmental conditions, they may also be heated correspondingly in the case of solar irradiation. Moreover, also waste heat may occur during operation of such roof antenna module, which locally equally leads to undesired heating.

It is the task of the present invention to provide a roof antenna module, an arrangement, a motor vehicle, and a method, in which the cooling of at least subcomponents of the roof antenna module is improved.

This task is solved by a roof antenna module, an arrangement, a motor vehicle, and a method according to the independent claims.

An aspect of the invention relates to a roof antenna module to be mounted on a vehicle roof of a motor vehicle. This roof antenna module comprises an antenna unit. The roof antenna module moreover comprises a control device. The control device comprises a housing. This housing may also be referred to as control device housing. The housing of this control device bounds a receptacle. Same is intentionally provided for receiving electronic components of the roof antenna module. Viewed in the vertical direction, the housing has a top side. The antenna unit is arranged on this top side of the housing. This top side of the housing is intentionally provided to face an internal side of the vehicle roof, in particular of an outer roof, in the assembled state of the roof antenna module with the vehicle roof. On this top side of this housing at least one flow channel for a cooling airflow is formed. This flow channel is separate from the receptacle. By such roof antenna module it is facilitated in a particularly advantageous way, to cool a specific interface region. This is the region between the control device and the vehicle roof. In particular this is the interface region formed between the control device and an outer roof of the vehicle roof. By this flow channel, which is integrated in the top side of the housing, a cooling airflow can be conducted precisely to this interface in a very specific manner. A particularly efficient cooling of this interface region is thereby facilitated. This cooling procedure is facilitated in a particularly advantageous way due to the fact that the flow channel is quasi completely separate from the receptacle. On the one hand, thus, the cooling airflow need not be conducted through the receptacle. Unwanted extensions of the flow path as well as possibly occurring turbulences in the receptacles can thereby be avoided. However, this concept of keeping the flow channel separate from the receptacle proves particularly advantageous to the effect that the electronic components in the receptacle are not contaminated by the cooling airflow. The penetration of dust and humidity or other constituents into the receptacle via the cooling airflow is thereby completely avoided. Thereby also the functioning of the electronic component in the receptacle is not impaired.

In an embodiment this top side of the housing faces this outer roof of the vehicle roof in the assembled state of the roof antenna module with the vehicle roof. The internal side is then that of the outer roof of the vehicle roof. The internal side intentionally faces a passenger compartment of the motor vehicle.

In an embodiment the flow channel has an opening on the top side of the housing facing away from the receptacle. In particular the flow channel is configured to be open on this top side facing away from the receptacle. It may be envisaged in an embodiment that the flow channel is configured to be open across at least 50 percent, in particular at least 60 percent, in particular at least 70 percent, in particular at least 80 percent, in particular at least 90 percent of its length, with which it extends in the top side. The flow channel in this connection is quasi configured as a groove across this length, across which it extends in the top side of the housing. By such embodiment of a flow channel that is open towards the top the cooling airflow in the flow channel then can also directly reach the internal side of the vehicle roof. A particularly efficient cooling process is thereby facilitated. In particular it is envisaged in this connection that in the case of an arrangement, in which the roof antenna module is installed on the vehicle roof, the internal side of the vehicle roof covers this flow channel in the region of the top side of the housing from above. Thereby then, viewed as a whole, a closed flow channel is formed. The cooling airflow is thereby conducted in a very specific manner.

In an embodiment the flow channel is bounded on an internal side by a wall of the antenna unit. An internal side in this connection, viewed in the width direction and thus in the horizontal direction, is quasi a lateral boundary. It extends in this regard in the height direction or substantially in the height direction. An internal side of a flow channel thus also extends from a bottom side of the flow channel, which bounds the flow channel from the bottom. By this embodiment then also the cooling airflow can quasi directly flow along the antenna unit itself. Also thereby the cooling effect for cooling the antenna unit is improved. The antenna unit therefore is mounted in such a way in the embodiment that it extends with this wall section, viewed in the height direction, into the housing of the control device.

In an advantageous embodiment the flow channel is bounded on such an internal side by an inner bounding web. This inner bounding web is a wall that is separate from the wall of the antenna unit. The inner bounding web, viewed in the horizontal plane, lies closer to the antenna unit than an outer bounding web, which laterally bounds the flow channel on the top side. In an embodiment the inner bounding web, starting from the top side of the housing, extends upward in elevated manner.

In an embodiment the flow channel on an external side is bounded by a bounding web. The outer bounding web in an embodiment is arranged on the top side of the housing. In an embodiment, starting from the top side of the housing, the bounding web extends upward in elevated manner. By such an embodiment it is then also facilitated that the top side of the housing, viewed per se, can be configured to be of a simpler design. An integrated recess or groove, respectively, which then forms the flow channel and quasi represents a depression in the top side, is then not required. Rather, the top side of the housing, viewed per se, can then be of an even design. Thus, a flow channel formed and in particular integrated in the housing can be configured to be of a very simple design.

On the other hand, in a different embodiment it is also facilitated that, starting from the top side of the housing, a recess or depression, respectively, is configured, which then represents or bounds, respectively, the flow channel. This flow channel, too, in an embodiment can then be integrally formed as a single piece with the housing. Thus, it is then generated to be integrally formed with the housing in a single joint manufacturing process.

If in the above-named embodiment the flow channel is bounded by the at least one inner and/or outer bounding web projecting from the top side upward in elevated manner, in this embodiment the antenna unit may be put upon the otherwise preferably smooth top side of the housing and mounted thereon.

The external side in this connection is to be understood to the effect that, in comparison with an internal side, viewed in the horizontal direction it is spaced further apart from the antenna unit. By the distance between the internal side and the external side the dimension of the flow channel in this horizontal direction is defined. This horizontal direction is in particular oriented to be perpendicular to the longitudinal axis of the flow channel.

In an embodiment the inner web and/or the bounding web is configured as soft material. In particular this soft material may be an elastomer. Such embodiment facilitates particularly advantageously that a bounding wall of the flow channel directly contacts the internal side of the vehicle roof. Thus, also a preferably pressed-on or pushed-on position can be achieved. By the elastic deformation possibility of the soft material here a corresponding pressing-on force can be generated. Also in the case of vibrations or different expansion coefficients of the individual components due to temperature it is then, however, achieved that the flow channel in this regard is given without leakage nevertheless. This is because the inner and/or outer bounding web even in these conditions then substantially across its entire length remains arranged to be in contact with the internal side of the vehicle roof.

In an embodiment the inner and/or the outer bounding web can end directly at the top side of the housing. In another embodiment on the housing a capping or a cover, respectively, can be arranged. This may be a mat or the like. This capping may be made from a material that is different from that of the housing, in particular a housing upper part. For instance this capping may be made from a soft material. This capping may be fixed permanently to the housing upper part. It is then arranged directly on the top side of the housing. This capping may comprise a basic layer, on the top side of which the inner and/or the outer bounding web are arranged and extend from the basic layer upward. The capping may be formed as a single piece. In the basic layer in an embodiment continuous stripes may be formed, by which the path of the flow channel is defined. In such an embodiment the flow channel in the flow channel section extending on the top side of the housing is bounded towards the bottom by the top side of the housing. Laterally the flow channel section is bounded by the thickness of the basic layer and possibly additionally by the inner and/or the outer bounding web.

In an embodiment the flow channel, viewed along its longitudinal axis, has an inlet formed on a bottom side of the housing. Thus, it is facilitated in particularly advantageous way that the cooling air is supplied from the bottom side of the housing and can be conducted towards the top side. Thus, substantial advantages arise with regard to the reservoir, from which the cooling air can be suctioned. In particular it is thus facilitated in a simple manner to suction cooling air from a passenger compartment of a motor vehicle. In particular it is then also facilitated that the cooling channel extends across the entire height of the housing in such a way that a subsection of the flow channel extends from the bottom side of the housing up to the top side of the housing.

This embodiment of the roof antenna module is also advantageous to the effect that a compact setup is facilitated and other components of the roof antenna module can be advantageously fixed to the control device.

In an embodiment the flow channel has a first flow channel section. The first flow channel section extends in the housing from the inlet of the flow channel up to the top of the housing. In an embodiment the first flow channel section is closed in the circumferential direction around its longitudinal axis. In particular it is in this regard closed across its entire length in the circumferential direction. The first flow channel section in an embodiment is completely separated from the receptacle. Thus, it is also achieved that also the cooling air stream, which is conducted via this first flow channel section, does not reach the receptacle. This cooling airflow thus is also conducted in the first flow channel section in the housing but completely external to the receptacle and running past it.

In an embodiment the flow channel comprises a flow channel section. Same may be referred to as further or second flow channel section. This is merely to be seen with regard to the position along the longitudinal axis of the flow channel in the flow direction of the cooling airflow. This flow channel section is open on the top side of the housing, which faces away from the receptacle. This further flow channel section in an embodiment comprises a first subsection, which is arranged on a second side running past the antenna unit. This further flow channel section in an embodiment comprises a second subsection, which is arranged on a second side running past the antenna unit. This is to be understood in the horizontal direction of the roof antenna module. It is thus envisaged in an embodiment that two separate subsections of this specific further flow channel section are formed, which on different sides, in particular in the width direction opposite sides of the antenna unit are conducted past the antenna unit. A particularly efficient cooling procedure of this interface between the control device and the vehicle roof, in particular the outer roof, is thereby facilitated. In particular here a particularly efficient cooling of this interface in the region of the antenna unit is rendered possible. This is because at the same time this antenna unit is namely cooled as well in an improved way. In particular this is effected on both sides. This means that in this embodiment this further flow channel section is split and flows past the antenna unit on the left side and on the right side. In an embodiment it may be envisaged that these two subsections, viewed in the flow direction, remain separated after the antenna unit. However, it is also possible that these two subsections, viewed in the flow direction of the cooling airflow, are joined again behind the antenna unit. In an embodiment the two subsections are joined at the outlet of the first flow channel section. Thereby they end jointly at this outlet.

In an embodiment it is envisaged that the two subsections are configured to be open towards the top across their entire length. In the assembled state with the vehicle roof that is separate from the roof antenna module they may be covered directly from above by the internal side of the vehicle roof, in particular the internal side of the outer roof of the vehicle roof.

Thereby, in the embodiment the subsections can also be formed again as subsections that are closed in the circumferential direction around their longitudinal axis.

In an embodiment the further flow channel section, which is open on the top side facing away from the receptacle, ends at an outlet of the first flow channel section. The first flow channel section with its outlet then ends directly at the inlet of the further flow channel section. This outlet of the first flow channel section is formed on the top side of the housing. In particular thus the further flow channel section of the flow channel is only that region which extends on the top side of the housing of the control device.

In an embodiment the roof antenna module comprises a fan. This fan comprises a fan housing. It also comprises a fan wheel. The fan is coupled to the flow channel for generating the air cooling flow. By the fan an efficient cooling is facilitated since the cooling airflow is correspondingly conveyed and thereby flows through the flow channel at a corresponding velocity. The fan may be an axial fan or a radial fan.

In an embodiment the fan housing is a housing that is separate from the housing of the control device. In an embodiment the fan housing, viewed in the height direction, may be arranged under the housing of the control device. A housing outlet of the fan housing in an embodiment is connected to an inlet of the flow channel, which is on a bottom side of the housing. Also thereby the compact setup of the roof antenna module is supported. A direct path of the cooling airflow from the fan housing to the inlet of the flow channel is thereby achieved. Very short paths of the entire cooling airflow are thereby facilitated.

In an embodiment the housing of the control device consists of multiple parts. In an embodiment it comprises a housing upper part, in which the flow channel is arranged in part. In an embodiment the housing upper part is made from metal. Preferably it may be made of aluminium. Thereby it is very lightweight. Moreover, thereby an improved heat conduction is facilitated.

In an embodiment the housing of the control device consists of multiple parts. In an embodiment it comprises a housing lower part. The housing lower part in an embodiment may be made from plastic. With regard to the designations of a housing upper part and a housing lower part this can be viewed in the height direction. The housing upper part in this connection is the top housing part and the housing lower part is the bottom housing part. The two housing parts may be directly connected with each other and then bound the receptacle.

A further aspect of the invention relates to an arrangement with a roof antenna module according to the above-named aspect or an advantageous embodiment thereof. The arrangement moreover comprises a vehicle roof. The roof antenna module is arranged on the vehicle roof that is separate therefrom. It is mounted thereon. This means that the roof antenna module is also fixed to this vehicle roof and retained thereon.

In an embodiment the vehicle roof comprises an outer roof. Same is in particular an external visible component of a motor vehicle. The vehicle roof in an embodiment comprises a headliner, which is arranged separate and spaced apart from the outer roof. Same is thus quasi arranged to be offset in the height direction downward from the outer roof. The headliner in an embodiment directly bounds the passenger compartment of a motor vehicle. The control device is arranged in a clearance between the outer roof and the headliner. The top side of this housing of the control device faces an internal side of the outer roof. By the internal side of the outer roof the flow channel in this section is closed towards the top.

If the flow channel is configured as an at least partly sunk-in groove in the top side, the top side directly contacts the internal side. If in another embodiment on the top side at least one inner and/or outer bounding web is formed that is configured to be elevated towards the top, in an embodiment only this bounding web with its top free rim edge contacts the internal side of the outer roof. The top side of the housing of the control device in this embodiment is then arranged spaced apart from the internal side of the outer roof.

In an embodiment the headliner has an opening. Same can also be referred to as a hole or a through-hole. Through this opening the cooling flow from the passenger compartment flows into the clearance. In particular it may flow in this regard from the opening into the flow channel.

In the mounted state of the roof antenna module on the vehicle roof the antenna unit extends on both sides of the outer roof reaching through the opening in the outer roof.

By this embodiment, in which that bounding region of the flow channel which directly contacts the internal side of the outer roof is preferably made from a soft material, also unwanted flow noises can be at least clearly reduced.

A further aspect of the invention relates to a motor vehicle. Same in an embodiment comprises an arrangement according to the above-named aspect or an advantageous embodiment thereof.

A further independent aspect of the invention relates to a method for cooling an interface region between an outer roof of a vehicle roof and a control device of a roof antenna module. The outer roof and the roof antenna module are integral parts of a motor vehicle, in particular according to the above-named aspect. The method includes the following steps:

activating the fan of the roof antenna module;

suctioning air from the passenger compartment of the motor vehicle by the fan;

introducing the suctioned air through an opening in the headliner into the flow channel of the arrangement;

conducting the cooling airflow generated in this way through the housing of the control device up to an outlet on the top side of the housing of the control device;

conducting the cooling airflow in the flow channel section of the flow channel on the top side of the housing in such a way that the cooling airflow flows directly along the internal side of the outer roof and the top side of the housing of the control device and thereby the interface region between the internal side and the housing is cooled.

In the method thus advantageously air is removed from the passenger compartment and used as cooling airflow in the arrangement. In particular therein by a fan, which is integral part of the roof antenna module, air is suctioned from the passenger compartment. Via a corresponding opening in the headliner this air then enters a fan housing and there is conveyed on the bottom side of the housing of the control device into an inlet of the flow channel. By the fan this air is then further conducted in the flow channel and reaches a top side of the housing, on which the flow channel equally extends with a corresponding section.

In an embodiment the entire cooling airflow across its entire length extends separate from the receptacle. It is thus conducted completely external to the receptacle in the housing of the control device.

Figure 2:
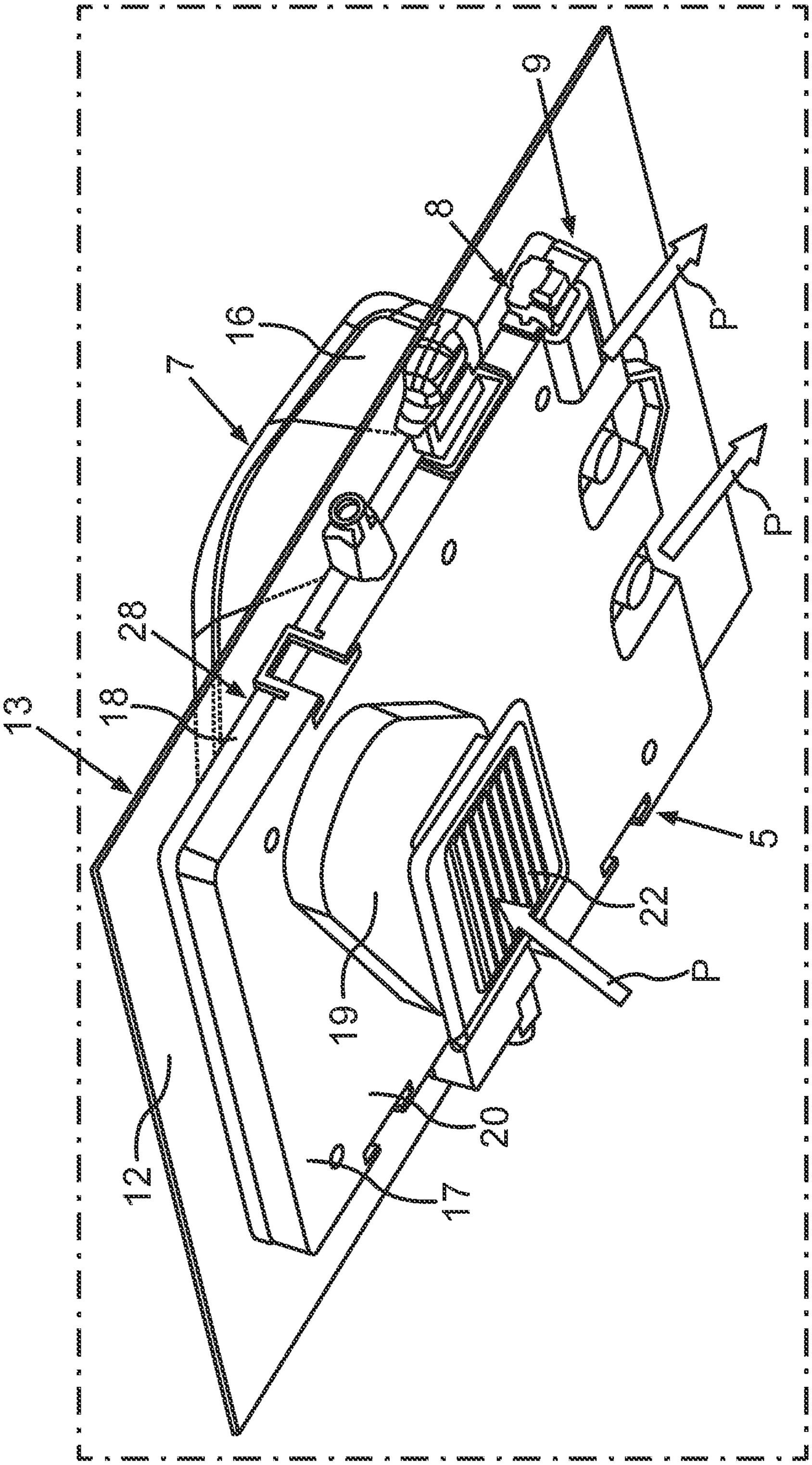
Figure 3:
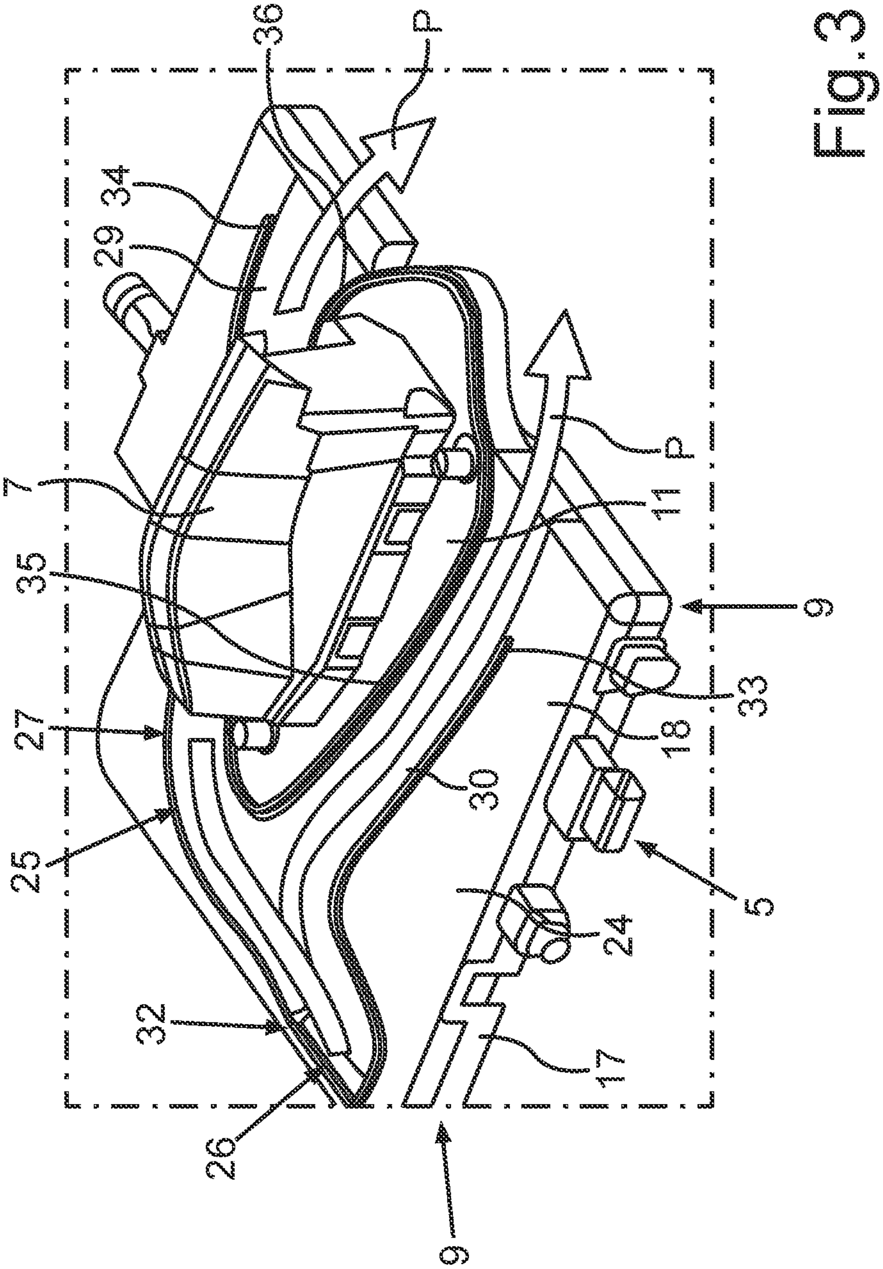
Figure 4:
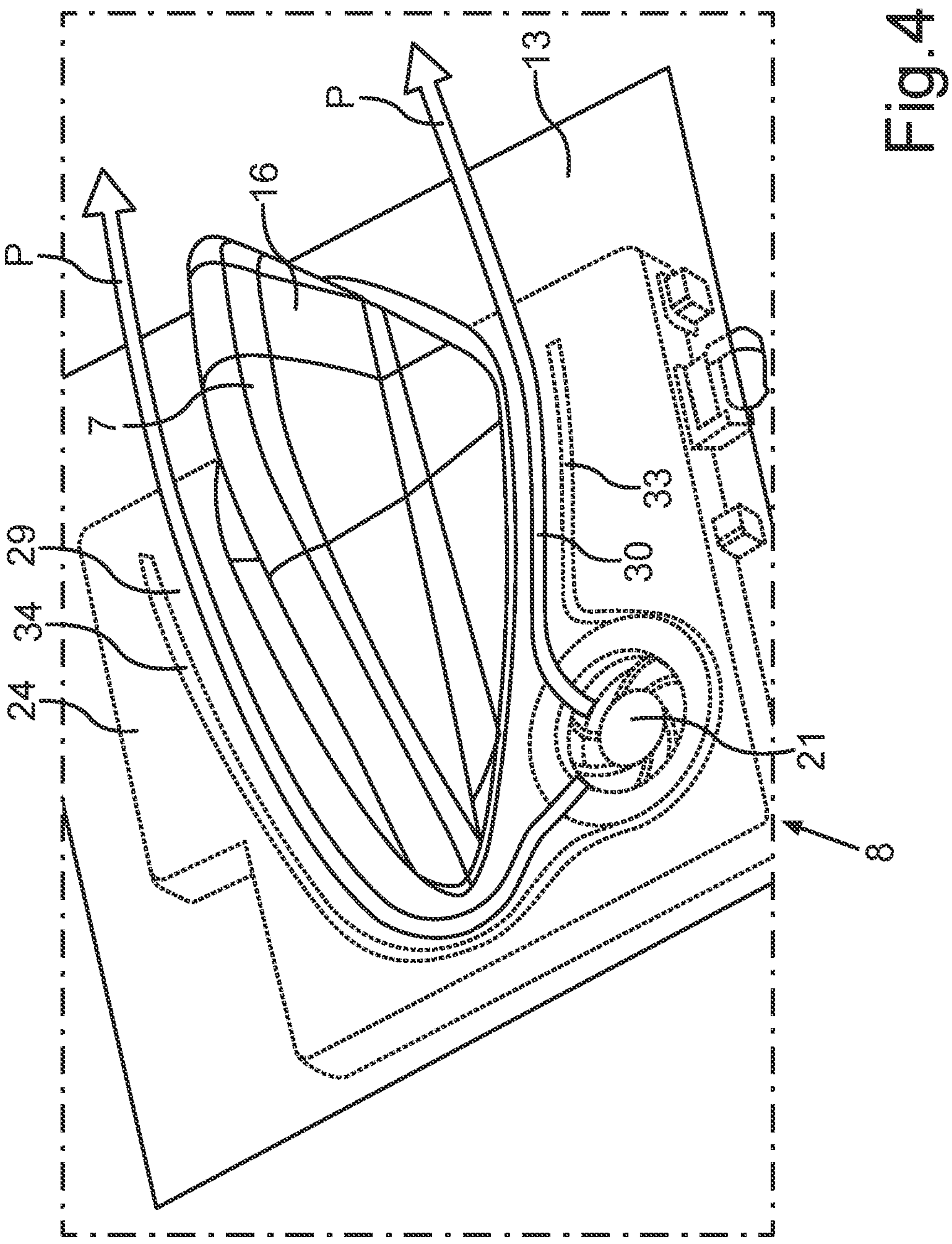
Figure 5:
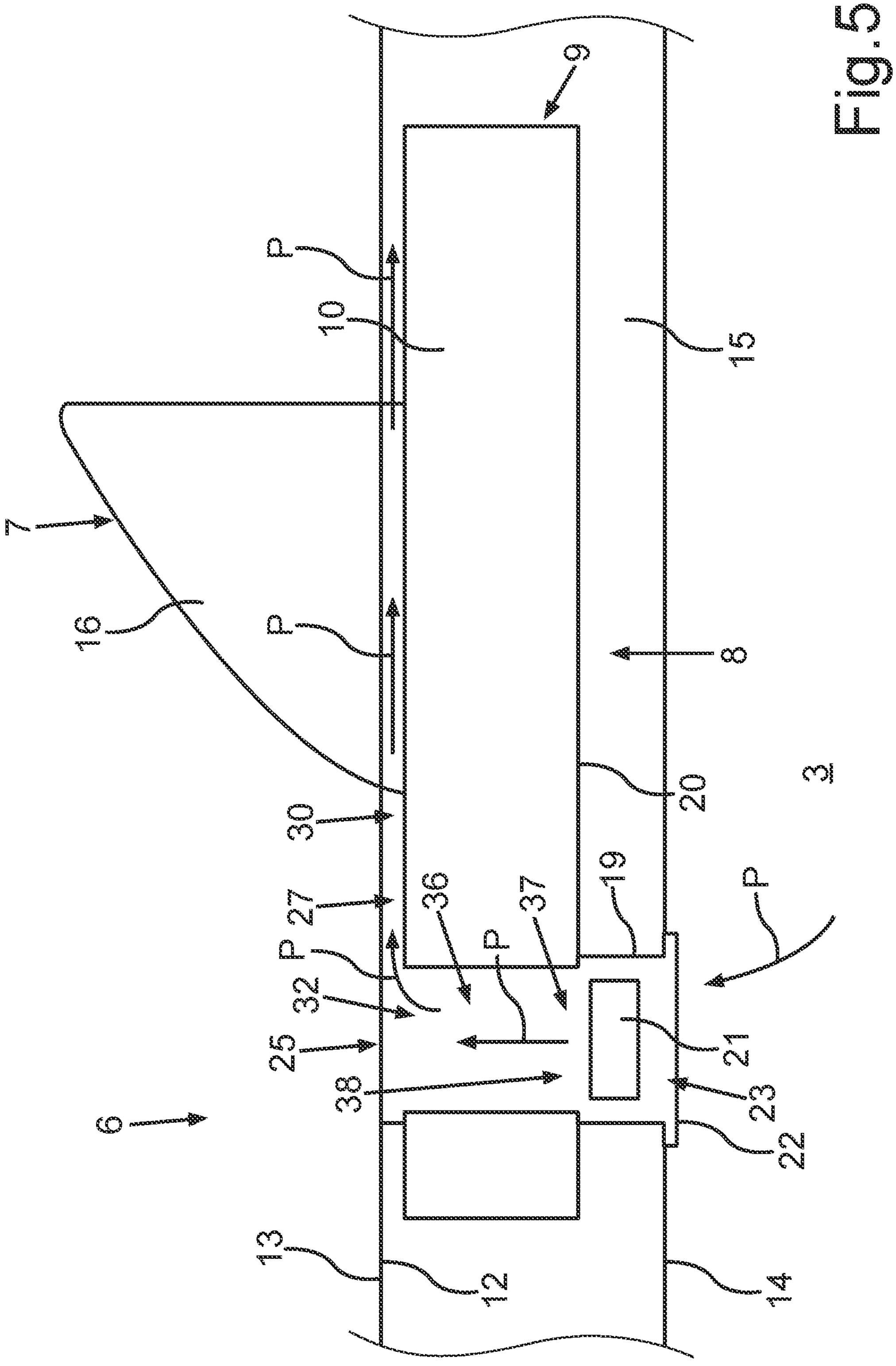

Embodiments of the invention are explained in further detail in the following. It is shown in:

FIG. 1 a schematic lateral view of an embodiment of a motor vehicle according to the invention with an embodiment of an arrangement according to the invention, which comprises an embodiment of a roof antenna module according to the invention;

FIG. 2 a perspective view of an embodiment of a roof antenna module according to the invention, which is arranged on a vehicle roof, wherein in FIG. 2 merely an outer roof of the vehicle roof is shown;

FIG. 3 a perspective view of an embodiment of a roof antenna module according to the invention;

FIG. 4 the representation in FIG. 2 in a perspective that is different from that of FIG. 2; and FIG. 5 a schematic view of a section through an embodiment of an arrangement according to the invention.

In the figures same elements or elements having the same function are equipped with the same reference signs.

In FIG. 1 in a schematic lateral view a motor vehicle 1 is shown. Same is here a passenger car. However, it may also be for instance a truck or lorry.

The motor vehicle 1 comprises a car body 2. This car body 2 also bounds a passenger compartment 3 of the motor vehicle 1. The motor vehicle 1 comprises a vehicle roof 4. On the vehicle roof 4 a roof antenna module 5 of the motor vehicle 1 is arranged. The vehicle roof 4 and the roof antenna module 5 form an arrangement 6. The roof antenna module 5 intentionally is provided to be mounted on the vehicle roof 4. The roof antenna module 5 comprises an antenna unit 7. Moreover, the roof antenna module 5 comprises a control device 8. The control device 8 comprises a housing 9. In the housing 9 a receptacle 10 (FIG. 5) is formed. Same intentionally is envisaged for the electronic components of the control device 8 and thus also the roof antenna module 5 to be arranged therein. The antenna unit 7 is arranged in an embodiment on a top side 11 (FIG. 3) of the housing 9. The top side 11 is intentionally envisaged to face an internal side 12 (FIG. 2) of the vehicle roof 4, in particular an internal side of an outer roof 13 of the vehicle roof 4, in the assembled state of the roof antenna module 5 with the vehicle roof 4.

As can be discerned in FIG. 1, the vehicle roof 4 comprises the outer roof 13. It moreover comprises a headliner 14. The headliner 14 is arranged separate from the outer roof 13. It bounds the passenger compartment 3. Between the headliner 14 and the outer roof 13 a clearance 15 is formed. In this clearance 15 the roof antenna module 5 in part is arranged therein. In particular the control device 8 is arranged therein. Also the antenna unit 7 in part extends into this clearance 15.

In FIG. 2 in a perspective view the arrangement 6 is shown. For the sake of better discernibility of the control device 8 the headliner 14 is not shown here. The antenna unit 7 comprises a finlike antenna housing 16. Viewed in the height direction, same is arranged to project upward beyond the outer roof 13.

The housing 8 in an embodiment comprises a housing lower part 17. Moreover, it comprises a housing upper part 18 that is separate therefrom. By the housing lower part 17 and the housing upper part 18 the already mentioned receptacle 10 is bounded, in particular closed. The housing lower part 17 may preferably be made from plastic. The housing upper part 18 in an embodiment may be configured to be made from metal. It may for instance be made from aluminium.

Preferably the housing lower part 17 comprises no additional heat sink for heat dissipation.

As can also be recognized in FIG. 2, the roof antenna module 5 also comprises a fan housing 19. Same is in particular a housing that is separate from the housing 9. The fan housing 19 in an embodiment is directly arranged on a bottom side 20 of the housing 9. The bottom side 20 faces away from the outer roof 13. In an embodiment a fan wheel 21 (FIG. 4) is arranged in the fan housing 19. The fan housing 19 and the fan wheel 21 are integral parts of a fan of the roof antenna module 5. It is in this regard positioned external to the housing 9. Moreover, in FIG. 2 in addition a cover grid 22 is shown. By this cover grid 22 an opening 23 (FIG. 1) in the headliner 14 is covered towards the passenger compartment 3. Nevertheless, the air from the passenger compartment 3 can pass through the cover grid 22 and can be sucked into the fan housing 19.

The control device 8 is in particular a telematic control unit device of the motor vehicle 1.

In FIG. 3 in a perspective view an embodiment of a roof antenna module 5 is shown from the above. The housing 9 has a top side 24 auf. This top side 24 faces the outer roof 13. In an embodiment the top side 24 may directly contact the internal side 12.

As shown in FIG. 3, in this top side 24 a flow channel 25 is configured. The flow channel 25 in this regard extends with a first flow channel section 26 from the bottom side 20 to the top side 24. In the flow direction, as it is represented by the arrows P in FIG. 3. following the first flow channel section 26 a further flow channel section 27 is configured. Same extends in particular in the top side 24. This flow channel section 27, viewed in the height direction, is open towards the top. This means that it is open on the side facing the outer roof 13. Thus the cooling airflow indicated by the arrows P may also flow directly on the internal side 12. An interface region 28, as it is shown in FIG. 2 and which is located between the control device 8 and the outer roof 13, thereby can be very efficiently cooled.

In FIG. 3 it can also be discerned that the antenna unit 7 in an embodiment is arranged on this top side 24, in particular arranged directly thereon. In the embodiment this further flow channel section 27 comprises a first subsection 29 and a second subsection 30 that is separate thereto. These two subsections 29 and 30 extend on sides of the antenna unit 7 that are opposite in the horizontal direction. They are joined in the flow direction before the antenna unit 7 and in this connection form the joint further flow channel section 27 in certain sections. This further flow channel section 27 ends at an outlet 32 of the first flow channel section 26. This outlet 32 is formed on this top side 24. An inlet of this further flow channel section 27 leads away from this outlet 32 and then splits before the antenna unit 7 into these two subsections 29 and 30. Therefore the first subsection 29 on a side of the antenna unit 7 bypasses same and the second subsection 30 bypasses the antenna unit 7 on the in this regard opposite side.

In an embodiment the flow channel section 27 is bounded by a first bounding web 33. The first bounding web 33 extends from the top side 24 upward. It is in particular formed as a single piece with the housing upper part 18. At least this bounding web 33 may be made from a soft material. The bounding web 33 is an outer bounding web.

By contrast, also the opposite subsection 29 is bounded by a bounding web 34. The bounding web 34 is an outer bounding web. Same, too, may be made of soft material. It equally extends upward in elevated manner beyond the top side 24. On the internal side, which faces the antenna unit 7, the flow channel section 27 in an embodiment may be equally bounded by bounding webs 35 and 36. These, too, project upward in elevated manner. These bounding webs 35 and 36 may be referred to as inner bounding webs. They lie closer to the antenna unit 7 in the horizontal direction than the outer bounding webs 33 and 34.

In an embodiment it is therefore possible that a direct contacting and thus a direct resting against the internal side 12 is only envisaged by these bounding webs 33, 34, 35, and 36.

The bounding webs 33 to 36 may be arranged directly on the top side 24. In an embodiment the roof antenna module 5 may additionally comprise a capping. Same is attached on the top side 24. This capping may be made from a soft material. It may comprise at least several bounding webs 33 to 36 in integrated manner. This capping comprises a basic layer. The basic layer may completely cover the top side 24 except for recessed stripes. By these stripes, which continuously extend throughout the thickness of the basic layer, the flow channel section 27 is predetermined. Laterally the flow channel section 27 is the bounded by the thickness of the basic layer. In particular it is additionally bounded by the height of the bounding webs 33 to 36. In this embodiment the top side 24 may be completely even.

In another embodiment the bounding webs 33 to 36 may not be present. Then the top side 24 may directly contact the internal side 12. In this embodiment the flow channel section 27 is formed by groovelike recesses in the top side 24 itself.

It is also possible that the top side 24 is not integral part of the housing upper part 18, but a plate-like capping or cover, respectively, which is separate therefrom, is present, as this has already been set out in the above. This capping then comprises the corresponding through-holes or cutouts, respectively, which then form the subsections 29 and 30. In such an embodiment this cover or this capping, respectively, may then be configured as a whole to be made from soft material. It may then equally comprise the bounding webs 33 to 36 or not.

In the embodiment shown here the further flow channel section 27 and thus in particular the subsections 29 and 30 are formed on their respective inner side to be spaced apart from the antenna unit 7. In another embodiment it is also possible that the subsections 29 and 30 on their internal side, which in each case faces the antenna unit 7, are bounded by walls of the antenna unit 7 itself.

In the flow direction behind the antenna unit 7 the two subsections 29 and 30 may continue to extend separately or they may be joined again in this regard in another embodiment.

In FIG. 4 the view in FIG. 2 is shown in a top view. The components arranged below the outer roof 13 in the form of the control device 8 and the fan housing 19 are suggested. In this embodiment then also the housing 16 of the antenna unit 7 is already attached, which in FIG. 3 is taken off.

In FIG. 5 in a schematic sectional view an embodiment of an arrangement 6 is shown. Air P is suctioned from the passenger compartment 3 by the fan into the fan housing 19.

The fan may be an axial fan. However, it may also be a radial fan.

The fan housing 19 on the top side facing the control device 8 comprises an outlet 37. Same transitions directly into the inlet 38 of the flow channel 25. As can be discerned, the flow channel 25 on its entire length in the control device 8 is separate and thus decoupled from the receptacle 10. This means that no air conducted through the flow channel 25 is conducted through the receptacle 10.

The first flow channel section 26, as already set out, extends from the bottom side 20 of the housing 9 up to the top side 24. There, the outlet 32 is then realized, at which the further flow channel section 27 ends.

The invention claimed is:

1. A roof antenna module to be mounted on a vehicle roof of a motor vehicle, the roof antenna module comprising:
- an antenna unit;
- a control device; and
- a fan comprising a fan housing and a fan wheel,
- wherein the control device comprises a housing,
- wherein the housing bounds a receptacle for electronic components of the control device,
- wherein the antenna unit is arranged on a top side of the housing, which is intentionally provided to face an internal side of the vehicle roof in an assembled state of the roof antenna module with the vehicle roof,
- wherein at least on the top side, a flow channel of the roof antenna module for a cooling airflow is formed, which is separate from the receptacle, and
- wherein the fan is coupled to the flow channel for generating the cooling airflow.

2. The roof antenna module according to claim 1,
wherein the flow channel is open on the top side facing away from the receptacle.

3. The roof antenna module according to claim 1,
wherein the flow channel on the internal side, which is closer to the antenna unit, is laterally bounded by an inner bounding web, which is formed on the top side and projects upward in an elevated manner.

4. The roof antenna module according to claim 1,
wherein the flow channel on an external side of the vehicle roof, which is more distant from the antenna unit, is laterally bounded by an outer bounding web, which is formed on the top side and projects upward in elevated manner.

5. The roof antenna module according to claim 3,
wherein the inner bounding web, at least in part, is made from an elastomer.

6. The roof antenna module according to claim 1,
wherein the flow channel comprises an inlet, which is formed on a bottom side of the housing.

7. The roof antenna module according to claim 6,
- wherein the flow channel comprises a first flow channel section, which extends in the housing from the inlet up to the top side of the housing, and
- wherein the first flow channel section is closed in the circumferential direction around its longitudinal axis and is separate from the receptacle.

8. The roof antenna module according to claim 7,
- wherein the flow channel comprises a second flow channel section, which is open on its top side facing away from the receptacle,
- wherein the second flow channel section comprises a first subsection, which is arranged on a first side extending past the antenna unit, and
- wherein the second flow channel section further comprises a second subsection, which is arranged on a second side opposite the first side extending past the antenna unit.

9. The roof antenna module according to claim 8, wherein the second flow channel section, which is open on its top side facing away from the receptacle, ends at an outlet of the first flow channel section, wherein the outlet is on the top side of the housing.

10. The roof antenna module according to claim 1, wherein the fan housing is arranged under the housing of the control device, and wherein a housing outlet of the fan housing is directly connected to an inlet of the flow channel, which is on a bottom side of the housing.

11. The roof antenna module according to claim 1, wherein the housing of the control device consists of multiple parts and comprises a housing upper part, in or on which the flow channel is in part arranged, and wherein the housing upper part is made from aluminum.

12. The roof antenna module according to claim 1, wherein the housing of the control device consists of multiple parts and comprises a housing lower part, and wherein the housing lower part is made from plastic.

13. An arrangement comprising a roof antenna module according to claim 1 and a vehicle roof, on which the roof antenna module is mounted.

14. The arrangement according to claim 13, wherein the vehicle roof comprises an outer roof, and a headliner separate therefrom and arranged spaced apart therefrom, which is configured to bound a passenger compartment of a motor vehicle, and wherein the control device is arranged in a clearance between the outer roof and the headliner, and is arranged to face an internal side of the outer roof with the top side of the housing in such a way that by the internal side of the outer roof a flow channel section, is closed towards the top.

15. The arrangement according to claim 14, wherein the headliner comprises an opening, through which air is able to flow as cooling airflow from the opening directly into the flow channel.

16. A motor vehicle comprising an arrangement according to claim 13.

17. A method for cooling an interface region between an outer roof of a vehicle roof and a control device of a roof antenna module, wherein the outer roof and the roof antenna module are an integral part of a motor vehicle, the method comprising:

activating a fan of the roof antenna module;

suctioning air from a passenger compartment of the motor vehicle by the fan;

introducing the suctioned air through an opening in a headliner of the motor vehicle into a flow channel of the roof antenna module for cooling airflow;

conducting the cooling airflow through a housing of the control device up to an outlet on a top side of the housing of the control device; and conducting the cooling airflow in a flow channel section of the flow channel, which is open in the housing on the top side of the housing in such a way that the cooling airflow flows directly along an internal side of the outer roof and the top side of the housing of the control device and thereby the interface region between the internal side and the housing is cooled.

18. A roof antenna module to be mounted on a vehicle roof of a motor vehicle, the roof antenna module comprising:

an antenna unit; and a control device, wherein the control device comprises a housing, wherein the housing bounds a receptacle for electronic components of the control device, wherein the antenna unit is arranged on a top side of the housing, which is intentionally provided to face an internal side of the vehicle roof in an assembled state of the roof antenna module with the vehicle roof, wherein at least on the top side, a flow channel of the roof antenna module for a cooling airflow is formed, which is separate from the receptacle, and wherein the flow channel comprises an inlet, which is formed on a bottom side of the housing.

* * * * *